(12) United States Patent
Pecnik et al.

(10) Patent No.: US 7,121,971 B1
(45) Date of Patent: Oct. 17, 2006

(54) AUTOMATIC TRANSMISSION

(75) Inventors: Hermann Pecnik, Nestelbach (AT); Susanne Paier, Graz (AT)

(73) Assignee: Steyr-Daimler-Puch AG & Co. KG, Vienna (AT)

( * ) Notice: Subject to any disclaimer, the term of this patent is extended or adjusted under 35 U.S.C. 154(b) by 0 days.

(21) Appl. No.: 09/184,553

(22) Filed: Nov. 2, 1998

(30) Foreign Application Priority Data

Nov. 3, 1997 (DE) .............................. 197 48 525

(51) Int. Cl.
*F16H 48/06* (2006.01)

(52) U.S. Cl. ...................................... 475/225; 475/221

(58) Field of Classification Search ................ 475/220, 475/221, 225, 248, 252, 253, 338, 339, 340
See application file for complete search history.

(56) References Cited

U.S. PATENT DOCUMENTS

| | | | | |
|---|---|---|---|---|
| 832,991 A | * | 10/1906 | Moores | ........................ 475/222 |
| 1,023,683 A | * | 4/1912 | Royce | ........................ 475/253 |
| 1,938,649 A | * | 12/1933 | Welsh | ........................ 475/252 |
| 4,612,824 A | * | 9/1986 | Ruhle | ........................ 475/204 |
| 4,645,029 A | * | 2/1987 | Sasaki et al. | ............... 180/249 |
| 4,779,699 A | * | 10/1988 | Hatano | ........................ 180/248 |
| 4,882,949 A | * | 11/1989 | Inoue | ..................... 475/248 X |
| 4,905,787 A | * | 3/1990 | Morin | ..................... 475/248 X |
| 5,246,408 A | * | 9/1993 | Kobayashi | .................. 475/221 |
| 5,435,794 A | * | 7/1995 | Mori et al. | ............. 475/338 X |

* cited by examiner

*Primary Examiner*—Ha Ho
(74) *Attorney, Agent, or Firm*—Bachman & LaPointe, P.C.

(57) ABSTRACT

A drive unit for driving at least two axles of an all-wheel drive vehicle, having a housing (3), an input gear (5) meshing with an output gear (4) of a gear-shift transmission (2), a center differential (6) coaxially disposed relative to the input gear (5) and one of the axles. To yield maximum rigidity at minimum structural dimensions the input gear (5) is rigidly mounted to a cage (20) of the center differential (6), the cage (20) being journalled at one end in a first tapered roller bearing (35) seated in the housing (3). A further output member (28) of the center differential (6) extends from the opposite end of the cage (20) and is rigidly connected to an output gear (10; 40) journalled in a second tapered roller bearing (36) seated in the housing (3) and provided with a third tapered roller bearing (37) wherein the other end of the cage (20) is journalled.

7 Claims, 3 Drawing Sheets

AUTOMATIC TRANSMISSION

BACKGROUND OF THE INVENTION

1. Field of the Invention

The invention, in general, relates to a transversely mounted drive unit for driving at least two axles of an all wheel drive vehicle, and, more particularly, to a drive unit comprising a housing, an input gear adapted to mesh with an output pinion of a gear shift transmission, a center differential arranged coaxially relative to the input gear and one axle, at least one output member for driving one axle and an output gear drivingly connected in coaxial relationship with a second output member of the center differential for driving the other axle.

2. Background of the Invention

There are two known problems which present themselves in connection with drive units having a transversely mounted engine-transmission block and a first driven axle arranged parallel thereto. One problem is encountered in providing sufficient mounting space outside of the motor structure for accommodating the additional drive elements required to drive the second driven axle, and the other problem is, if at all possible to accommodate those elements without altering the structural elements required for driving only one axle. The former problem often imposes compromises in respect of the size of the output gear and of the mounting support.

OBJECT OF THE INVENTION

It is, therefore, an object of the invention to provide a structure which solves these problems without compromises in respect of its dimensions.

BRIEF SUMMARY OF THE INVENTION

In the accomplishment of this and other objects, the invention provides for:
a) rigidly connecting the input gear to the cage of the center differential;
b) journalling one end of the cage of the center differential in a tapered roller bearing in the housing;
c) extending a second output member of the center differential from the opposite end of the cage and rigidly connecting it to an output gear; and
d) journalling the output gear in a second tapered roller bearing in the housing and journalling the cage of the center differential in a third tapered roller bearing in the output gear.

By connecting the center differential and the input gear, the former may be moved towards the transmission against the first tapered roller bearing seated in the wall of the housing and thus create more space near the engine without enlarging the existing housing. The output member may extend into the space, and the output gear may be arranged there. In this connection, it is important, for purposes of the dimensions of the gearing, to provide sufficient space in the axial direction. Sufficient space results from journalling the cage in the output gear. Thus, even at a very small space of the first driven axle from the engine housing, sufficient space remains in the transverse direction towards the clutch housing, so that the diameter of the output gear may remain large. Thus, the distance between the bearings supporting the cage is also short, and the unit is correspondingly rigid. This is advantageous as regards both service life and operating noise level. In addition, significant axial forces can be absorbed so that it is possible to structure the output gear with a large helix angle or even as a bevel gear.

If the tapered roller bearings are disposed such that their effective cones have the same point, the bearing forces acting on the second tapered roller bearing will exert no tilting moment on the output gear. This results in significantly improved running accuracy or trueness of the center differential and of the output gear.

In an advantageous embodiment of the invention and depending upon structural conditions, the output gear may be additionally supported in the housing by an auxiliary bearing. Since the forces are low and free of any axial component, a light roller or needle bearing is sufficient for this purpose.

In an advantageous embodiment of the invention and depending upon structural conditions, the output gear may be additionally supported in the housing by an auxiliary bearing. Since the forces acting on the gear are low and free of any axial component, a light roller or needle bearing is adequate for this purpose.

In a preferred embodiment, the center differential is a unique structure. It is provided with first and second planetary gear trains, the first planetary gear train being provided with a planet carrier and planet gears rigidly connected to the cage, a sun gear connected to one half-shaft of the first driven axle and with an internal gear. The second planetary gear train is provided with an internal gear rigidly connected to the internal gear of the first planetary gear train, a sun gear connected to the other half-shaft of the first driven axle as well as with a planet carrier which constitutes the further output member and which is provided with two planetary gears meshing with each other. Such structure allows incorporating the function of an axle differential for the first driven axle into the center differential while at the same time significantly reducing the axial dimension of the center differential. The axial space required by a center differential structured in this manner is smaller than the bevel gear axle differentials used in a conventional vehicles with only one driven axle.

Two structures have been found to be of advantage for the further output member driving the second axle: In one structure, an intermediate shaft journaled in the housing is provided with a spur gear and with a bevel gear with the bevel gear meshing with a further bevel gear. In an alternative structure the output gear is structured as a bevel gear. The latter structure is only possible because the unique arrangement of the tapered roller bearings is capable of absorbing large axial forces.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of preferred embodiments when read with reference to the appended drawings, in which:

DETAILED DESCRIPTION OF PREFERRED EMBODIMENTS

Figure 1:
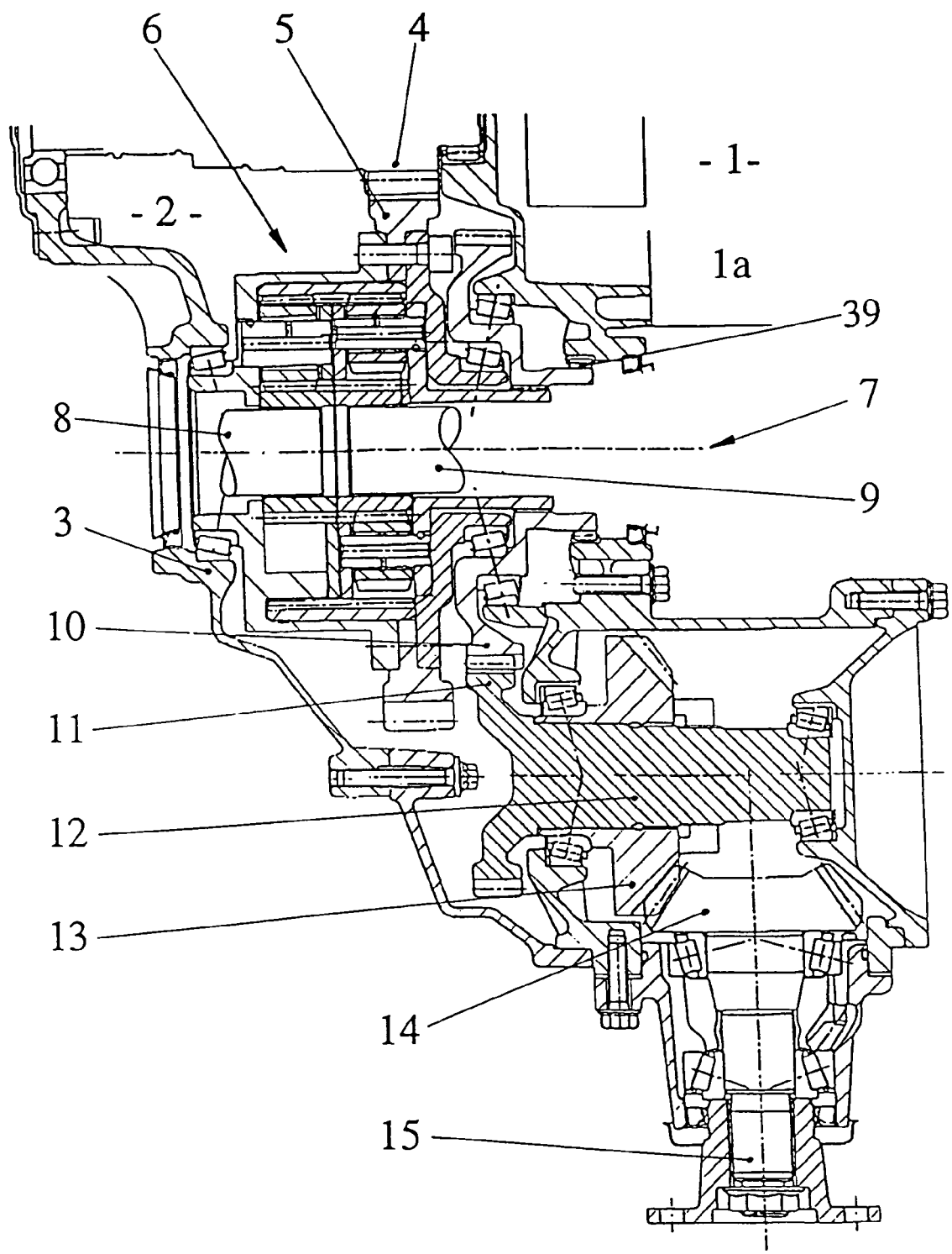
FIG. 1 is an approximately horizontal sectional view of a first embodiment of the invention.

In FIG. 1, reference numeral 1 designates an engine, and 1a denotes the contour of the engine which is critical to the spatial conditions. A gear shift transmission is schematically shown at 2, and the housing of the drive unit connected therewith is shown at 3. An output pinion 4 of the transmission 2 drives an input gear 5 of the drive unit. The input gear 5 is rigidly connected to a center differential 6. The center differential will be seen to have a center axis 7 which also constitutes the center axis of the input gear 5 as well as of the left and right half-shafts 8 and 9 of a first driven axle. An output gear 10 for driving a second driven axle is driven by the center differential 6. The output gear 10 meshes with a spur gear 11 which is connected to an intermediate shaft 12, and a bevel gear 13 also connected to the shaft 12 in turn drives a further bevel gear 14 mounted on a shaft 15 for driving the second axle (not shown).

Figure 2:
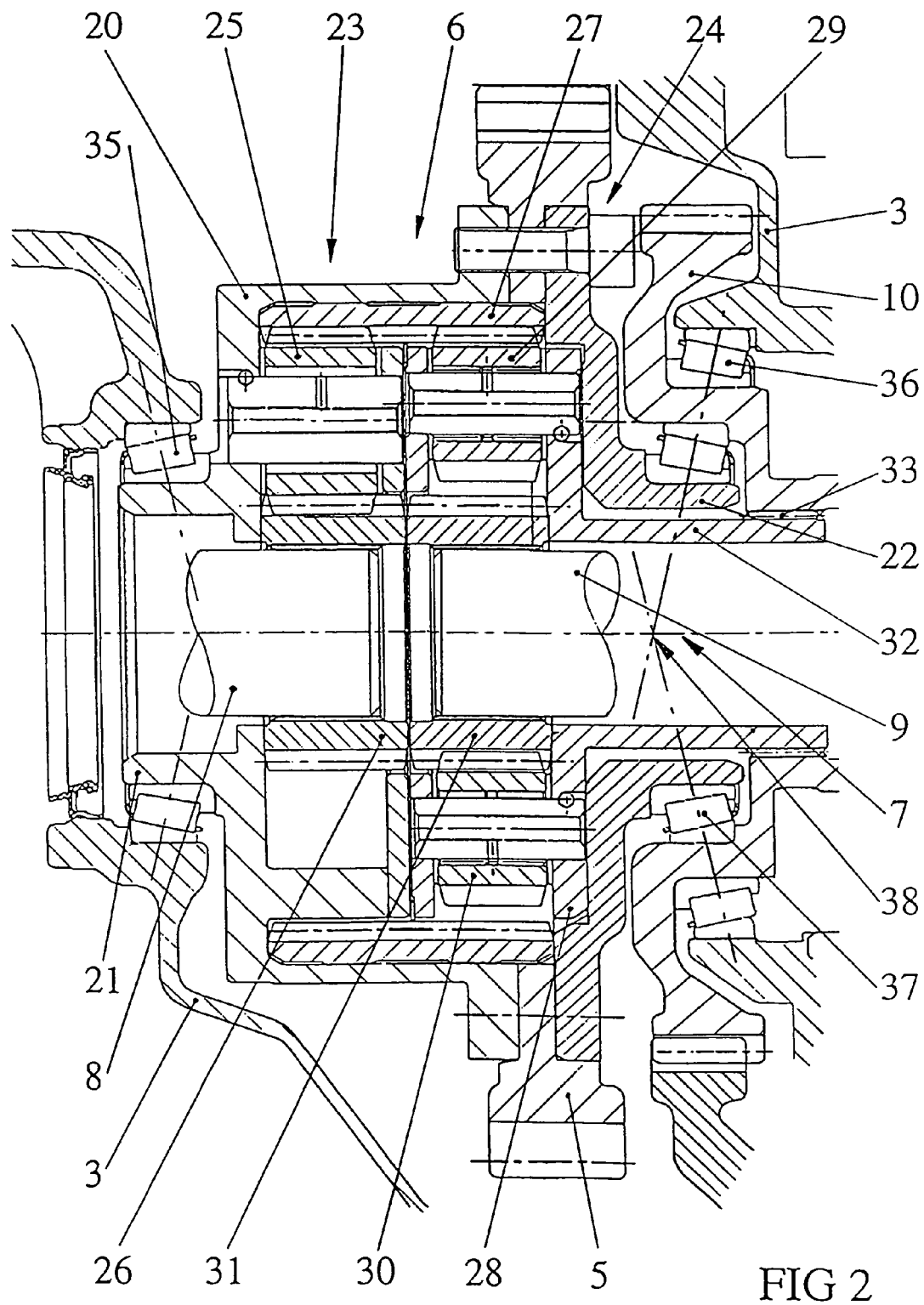
FIG. 2 is an enlarged view of the essential portion of FIG. 1.

The center differential 6 is shown on an enlarged scale in FIG. 2. The differential 6 is encased by a cage 20. The cage 20 may be divided and is rigidly connected to the input gear 5. At both of its ends, the cage 20 forms bearing sleeves 21, 22, the arrangement being such that the input gear 5 is closer to the right bearing sleeve 22 than it is to the left sleeve 21. First and second planetary gear trains 23 and 24 are accommodated within the cage 20. The first planetary gear train 23 consists of a planet carrier constituted by the cage 20, planet gears 25, a sun gear 26 drivingly connected to the left half-shaft 8 of the first driven axle and an internal gear 27 which is freely rotatable within the cage 20. The second planetary gear train 24 consists of a planet carrier 28, first and second planet gears 29 and 30, with a first planet gear always meshing with a second planet gear, and of a sun gear 31 connected to the right half-shaft 9 of the first driven axle. The first planet gears 29 mesh with the internal gear 27. The internal gear 27 is shared by the first and second planetary gear trains 23 and 24. The second planet gears 30 mesh with the sun gear 31.

The planet carrier 28 of the second planetary gear train 24 is provided with an axial hollow shaft 32 protruding from the second bearing sleeve 22 of the cage 20. The hollow shaft 32 is splined at 33 to the spur gear 10.

At one of its end, the cage 20 of the center differential 6 is journalled in a tapered roller bearing 35 seated in the housing 3. At its opposite end, the cage 20, by way of the second bearing sleeve 22, is journalled in a third tapered roller bearing 37 seated in an axial recess of the output gear 10. The output gear 10 is in turn journalled in a second tapered roller bearing 36 seated in the housing 3 and, optionally, in an additional small support bearing 39. In FIG. 1, the small support bearing 39 has been shown as a needle bearing. Alternatively, it could be supported in the cage 20. The second and third tapered roller bearings 36 and 37 are disposed such that the apex of their pressure cones lies at point 38 on the axis 7.

Figure 3:
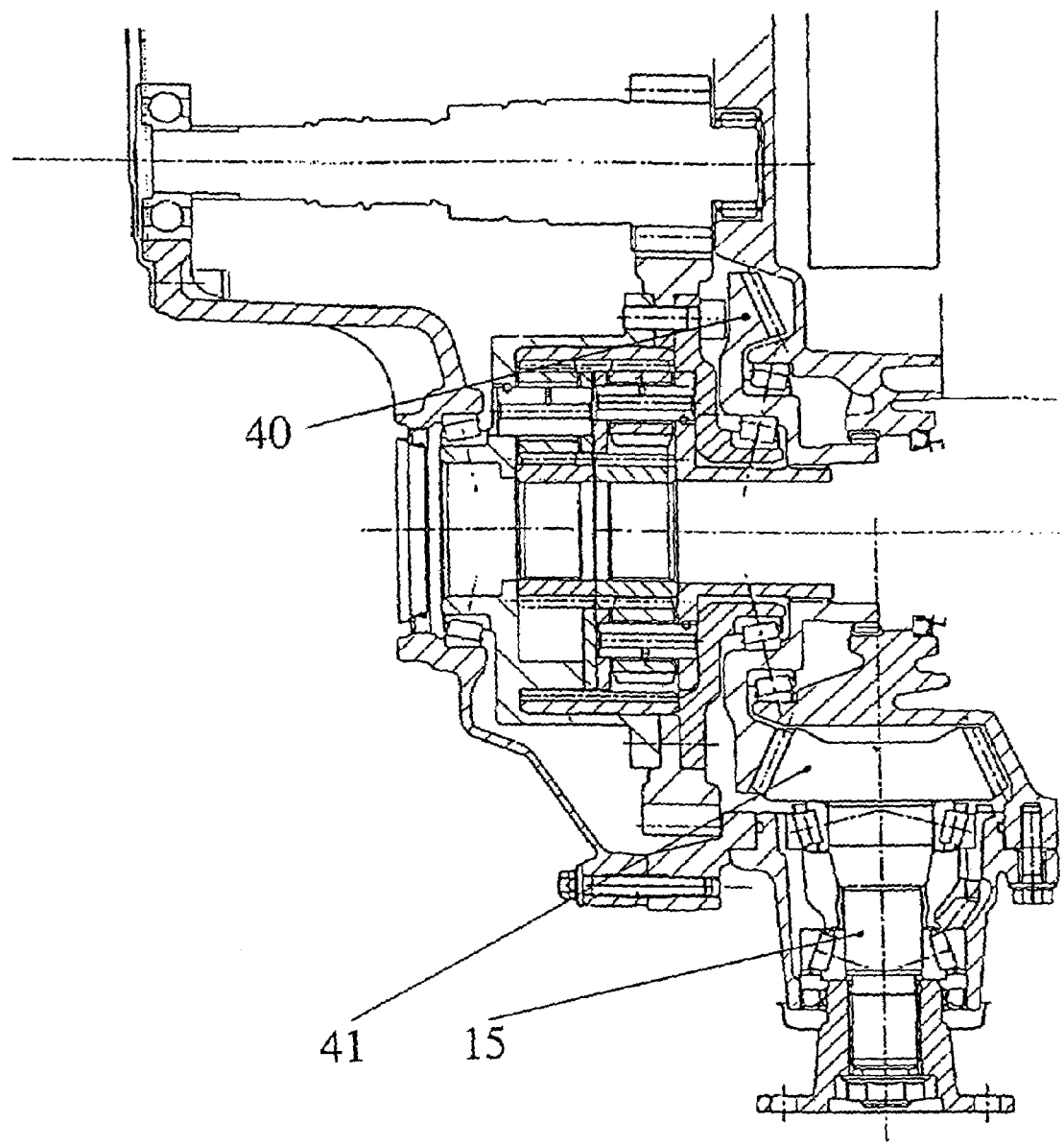
FIG. 3 is an approximately horizontal sectional view of a second embodiment of the invention.

The embodiment of FIG. 3 is distinct from that of FIG. 1 in that the output gear 10 of FIGS. 1 and 2 is structured as a bevel gear 40 meshing with a further bevel gear 41 mounted on the shaft 15 for driving the second axle (not shown). Such a structure is possible because the bearing support of the bevel gear 40 is capable of absorbing large axial forces.

Having described our invention, what we claim is:

1. A transverse-mounted drive unit for distributing the output of an automotive transmission to first and second axles of a vehicle, comprising:

a housing comprising first and second axially spaced bearings;

a center differential comprising a cage coaxially mounted on the first axle and provided with at least one output member for driving the first axle and a second output member for driving the second axle;

an input gear coaxially coupled to the cage and adapted to be driven by an output gear of the transmission;

first and second bearing sleeves extending axially in opposite directions from the cage, the first bearing sleeve being journalled for rotation in the first bearing;

an axial extension protruding from the second output member beyond the second bearing sleeve; and an output gear coupled to the axial extension for meshing with a drive gear connected to the second axle, the output gear being journalled in the second bearing and provided with an axial recess receiving a third bearing in which the second bearing sleeve is journalled.

2. The drive unit of claim 1, wherein the first axle comprises first and second axially aligned half-shafts.

3. The drive unit of claim 2, wherein the center differential comprises first and second planetary gear trains, the first planetary gear train comprising a planet carrier rigidly connected to the cage and provided with planet gears, a sun gear connected to the first half-shaft and an internal gear freely rotatable in the cage, the second planetary gear train comprising an internal gear rigidly connected to the internal gear of the first planetary gear train, a sun gear connected to the second half-shaft and a planet carrier constituting the second output member and comprising at least one pair of meshing planet gears.

4. The drive unit of claim 1, further comprising an intermediate shaft rotatably journalled in the housing and connected with a spur gear meshing with the output gear and a bevel gear adapted for meshing with a bevel gear connected to a shaft for driving the second axle.

5. The drive unit of claim 1, wherein the output gear is a bevel gear adapted to mesh with a bevel gear connected to a shaft for driving the second axle.

6. The drive unit of claim 1, the second and third bearings are tapered roller bearings.

7. The drive unit of claim 6, wherein the second and third roller bearings are disposed in such a way that the apexes of their pressure cones on the axis coincide.

* * * * *